N. AUBIN.
Making Oil and Water Gas.
No. 679. Reissued Apr. 5, 1859.
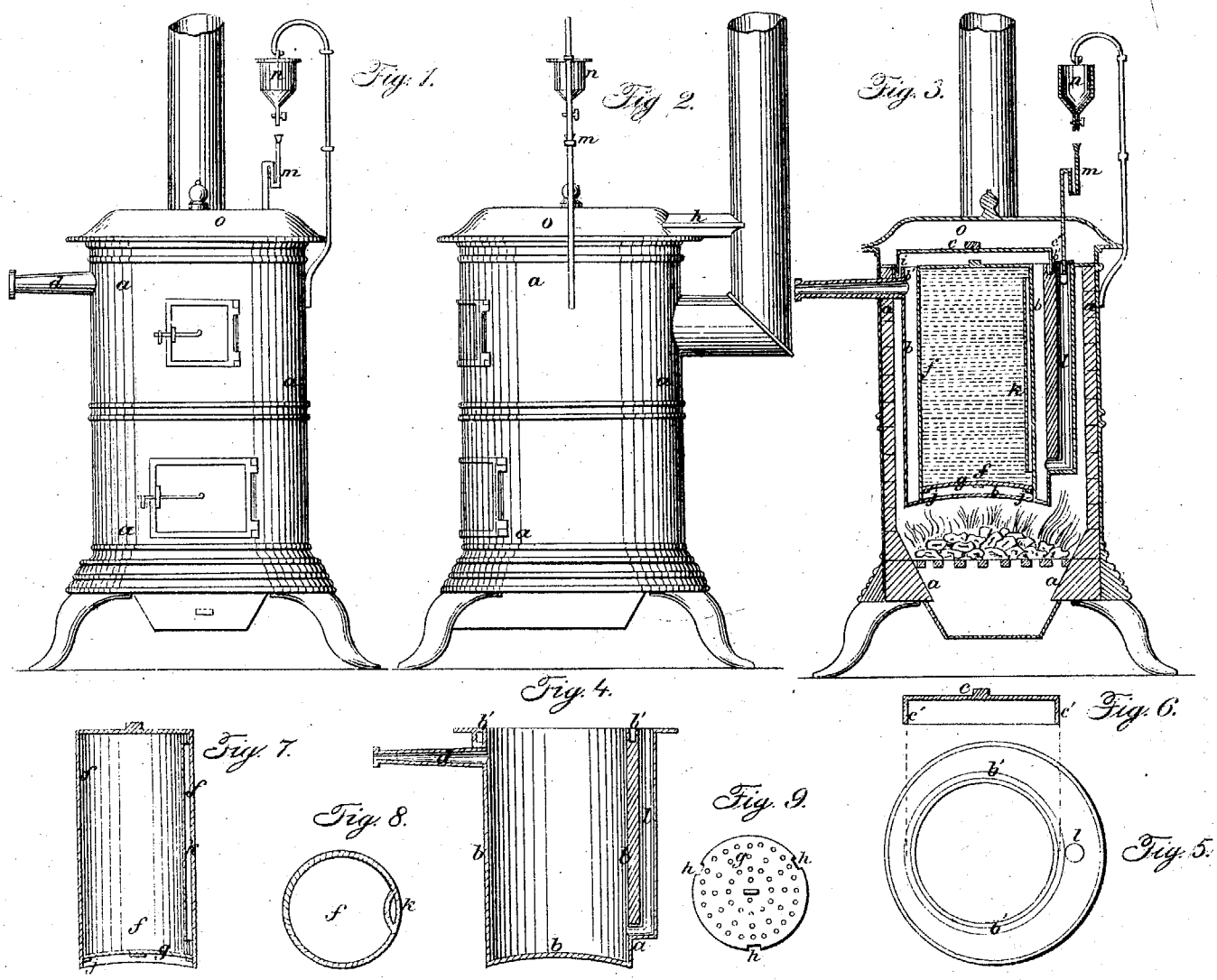

UNITED STATES PATENT OFFICE.

N. AUBIN, OF ALBANY, NEW YORK.

IMPROVEMENT IN MAKING ILLUMINATING-GAS.

Specification forming part of Letters Patent No. 14,045, dated January 8, 1856; Reissue No. 679, dated April 5, 1859.

*To all whom it may concern:*

Be it known that I, N. AUBIN, of the city and county of Albany, and State of New York, have invented a certain new and useful Process for Making Illuminating-Gas; and I do hereby declare that the following specification, taken in connection with the drawings, is a full, clear, and exact description thereof.

In the drawings, Figure 1 is a front elevation of the exterior of an apparatus by means of which my process can be carried out. Fig. 2 is a side elevation of the same. Fig. 3 is a vertical section through it. Fig. 4 is a vertical section through the retort or gas-generator. Fig. 5 is a top or bird's-eye view of the same. Fig. 6 is a vertical section through the cover of the retort; Fig. 7, a vertical section through the charger and container of materials; Fig. 8, a horizontal section through the same, and Fig. 9 a plan of the perforated bottom of the charger.

The nature of my invention consists in generating gas, for purposes of heating or illumination, from a mixture of grease, rosin, oil, tar, or other similar substances rich in hydrogen and carbon, with other porous or coarsely-divided substances which in themselves contain little or no gas—such as charcoal, broken brick, coke, &c.—and are slow conductors of heat, by introducing the same into a charger open at bottom, which is inserted within a retort in such manner as to compel the products of the mixture, when acted upon by heat, to pass out of this charger or interior chamber and in close contact with the bottom of the retort, and thence to a gasometer or receiver, substantially in the manner specified.

In the drawings, a furnace of any suitable materials and form, and provided with a charging-door for coal and another for cleaning fires, with grate, ash-pit, and chimney, or any proper equivalents for maintaining a fire, is represented at *a a a*, and within this furnace, so supported as to be heated by the fire, is a retort, *b b*, of any proper form, in the present instance cylindrical, with a bottom dished upward. This retort is open at the upper end, and provided with a suitable cover, *c*, which may be fitted gas-tight thereto in any proper manner, the joint represented being one made by allowing a rim, *c'*, in the cover to enter a groove, *b'*, in the top of the retort, which is to be filled with metal or alloy fusing at a heat below that to which the retort is exposed. This retort has any suitable neck—such as *d*—through which the gas as made is to be carried off, and is to be fitted with an interior chamber—such as *f*—closed at top when in use, and conforming somewhat in shape to the interior of the retort, but smaller. This chamber is open at the bottom, but has fitted thereto a grating or perforated piece of metal—such as shown at *g*—which may be removed therefrom, or fitted into place, such bottom being notched, as at *h h*, in correspondence with certain lugs, *j j*, attached to the inner side of the chamber, near the bottom thereof, so that the bottom may be slipped in over the lugs and then turned partially around, being held in place while in such position, or removable on being turned, so that the notches and lugs again correspond. The chief use of this bottom is to prevent the dropping out of the gas making materials while the chamber is introduced, or of the residuum thereof while the chamber is being removed, the chamber being, in fact, open at bottom, as far as the process of making gas is concerned. This chamber has within it a pipe or tube opening into the chamber at its top and bottom, the use of such pipe, as at *k*, being to admit of the free passage of hydrocarbon vapors from one end of the chamber to the other, so as to equalize the pressure therein in case of any solid closure across the retort, due to the melting and running together of its contents. This device is, however, a nicety or perfection in construction not absolutely necessary in practice, and the same may be said of the steam-generator *b*, which is to be filled with coke, broken bricks, pumic-estone, or such like substances, and to be supplied with water through a siphon-tube, *m*, which receives water from a dropping-vessel, *n*. This generator connects with the lower part of the retort, and when in use supplies it with superheated steam, which is found in practice to prevent the minute deposits of carbon that would otherwise occur. There is a dome, *o*, over the retort having an opening larger than the retort cover and closed by a proper lid. The interior of this dome connects with the chimney by a pipe, *p*, and when it is used it carries off vapors or gas that may escape when the retort cover is removed, and also acts as a jacket, preventing loss of heat.

The essential parts of the apparatus for carrying out my process are, the retort, with means of heating the same, and the interior chamber for receiving the charge and causing the hydrocarbon vapors to descend to and pass over the bottom of the retort and in contact with the heated sides thereof.

In making gas by my process porous or coarsely-divided substances, slow conductors of heat and containing little or no gas—such as charcoal, bricks, &c.—are to be mixed with materials rich in gas when subjected to heat—such as rosin, grease, oil, &c.—and the mixture introduced into the interior chamber, the most advantageous proportions being about one part, by volume, of the latter to three of the former. The retort is then to be closed gas-tight, and on the mixture being subjected to heat the following results take place: The hydrocarbons form hydrocarbon vapors, which, with the melted or heated oils and tars, descend to the bottom of the retort, there coming in contact with the highly-heated bottom of the retort, whence they escape by passing under the interior chamber, and thence rise between such chamber and the heated sides of the retort, being converted from vapor into non-condensible gas in their passage over the highly-heated bottom and sides. Now, a consideration of the apparatus will show, first, that the mixture in the inner chamber can never be exposed to a heat as great as that possessed by the bottom or sides of the chamber; second, that all the gas-making materials within the inner chamber must be subjected nearly to the same degree of heat; third, that the vapors must all receive a nearly equal accession of heat, as they must pass over nearly the same amount of heated surface in the bottom and sides of the retort. It appears to me, moreover, that the conversion of each particle of the gas-making materials into gas must take place gradually, distillation going on in the inner chamber and conversion while passing over the heated retort-surface and under nearly, if not exactly, the same circumstances, this last effect, as well as the second above stated, being due partly to the fact that the material subjected to heat within the chamber is a mixture substantially such as specified, which, even when heated, is of an open porous texture—a sort of spongy mass—which permits of the gradual and constant passage of vapors or of oils as fast as they are evolved by heat. The heat is therefore abstracted from the bottom and sides of the retort gradually and constantly, and the retort remains at a constant heat, or nearly so. If the vapors and oils descended in masses, with greater or less intervals of time between them, the retort must be cooled while converting these masses into gas, and would heat up again while waiting for the descent of another mass. Whether this theory be correct or not is of no great importance, as certain beneficial results certainly do follow when gas is made according to my process, which consists, first, in mixing materials substantially such as are specified; second, in heating that mixture in a chamber within a retort; third, in causing the products of distillation to pass in contact with the highly-heated bottom and sides of a retort, all substantially in the manner specified. And there can be no doubt but that there is a mixture charged into a chamber within a retort, and that the products of distillation do, in the course of their conversion into gas, first pass out of such interior chamber, and then in close contact with the heated bottom and sides of the retort. The vapors which have descended escape out under the sides of the interior chamber, owing to the fact that there is no tight joint between it and the bottom of the retort, while the interior chamber itself is closed gas-tight at top while gas is being generated, and when the interior chamber is loose and light the vapor will lift it, owing to the pressure therein being slightly greater than it is within the retort.

The precise form of apparatus in which to carry out my process is a matter of but little importance so long as the construction is such as to cause distillation in a comparatively cool place, and then to insure the passage of the vapors over a highly-heated surface and in close contact therewith, substantially in the manner specified. And although I have throughout this specification spoken of bottom and sides of the retort as distinct surfaces acting to decompose the vapors, still it is clear that they are actually only one surface, and that if the bottom surface were sufficiently extensive to insure proper decomposition, the sides, or rather the passing of the vapors over the sides, would be a matter of no moment, as the same results would still be produced substantially in the same manner.

In order to produce the best results, the space between the charge and the bottom of the retort and between the sides of the chamber and sides of the retort should not be greater in proportion to the whole size of the retort than is represented in the drawings, the object being to pass all the vapors or mixed gas and vapors in contact, or nearly so, with the heated surface.

If the interior chamber be a removable one, the residuum may be removed in the chamber, and such is the construction of the apparatus that I prefer; but good results may be obtained when the mixture is charged into the chamber when in position in the retort and the residuum removed without removing the inner chamber.

I claim as of my own invention—

The herein-described process of making gas for heating or illumination, which consists; first, in mixing materials substantially such as are herein specified; second, in introducing them into a chamber, substantially such as is described, located, when the process is going on, within the retort; third, in causing the products of distillation of the mixture to pass out of such interior chamber, and then be subjected to a higher degree of heat by passing in contact with the heated surface of the retort itself, substantially as specified, not intending to claim any one step of the process separately, but only the process substantially as herein set forth as a whole.

In testimony whereof I have hereunto subscribed my name, in the city of Albany, on this 27th day of March, A. D. 1858.

N. AUBIN.

In presence of—
R. J. WILSON,
CHARLES KNICKERBOCKER.